United States Patent [19]

Center, Jr. et al.

[11] Patent Number: 5,631,089
[45] Date of Patent: May 20, 1997

[54] PREPARATION OF GLASS/PLASTIC LAMINATES HAVING IMPROVED OPTICAL QUALITY

[75] Inventors: Luther W. Center, Jr., Circleville, Ohio; Charles A. Smith, Vienna, W. Va.

[73] Assignee: E. I. Du Pont de Nemours and Company, Wilmington, Del.

[21] Appl. No.: 185,913

[22] PCT Filed: Jul. 30, 1991

[86] PCT No.: PCT/US91/05395

§ 371 Date: Mar. 10, 1994

§ 102(e) Date: Mar. 10, 1994

[87] PCT Pub. No.: WO93/02857

PCT Pub. Date: Feb. 18, 1993

[51] Int. Cl.⁶ .................................................. B32B 17/10
[52] U.S. Cl. .................... 428/437; 156/99; 156/102; 156/106; 156/289; 156/323; 428/436; 428/483; 428/908.8
[58] Field of Search .................... 156/99, 102, 106, 156/289, 323; 428/436, 437, 438, 908.8

[56] References Cited

U.S. PATENT DOCUMENTS

| | | | |
|---|---|---|---|
| 2,779,684 | 1/1957 | Alles | 430/535 |
| 3,781,184 | 12/1973 | Domicone et al. | 161/165 |
| 3,806,387 | 4/1974 | Peetz et al. | 156/102 |
| 3,899,314 | 8/1975 | Siegmund | 65/23 |
| 3,900,673 | 8/1975 | Mattimoe et al. | 428/339 |
| 3,960,627 | 6/1976 | Halberschmidt et al. | 156/104 |
| 4,059,469 | 11/1977 | Mattimoe et al. | 156/108 |
| 4,072,779 | 2/1978 | Knox et al. | 428/220 |
| 4,141,771 | 2/1979 | Banker et al. | 156/222 |
| 4,177,315 | 12/1979 | Ubersax | 428/336 |
| 4,469,743 | 9/1984 | Hiss | 428/215 |
| 4,643,944 | 2/1987 | Agethen et al. | 428/349 |
| 4,943,484 | 7/1990 | Goodman | 428/441 |
| 5,107,643 | 4/1992 | Swensen | 52/202 |

*Primary Examiner*—D. S. Nakarani
*Attorney, Agent, or Firm*—Oscar A. Towler, III

[57] ABSTRACT

A glass/plastic laminate useful in glazing applications which has improved optical quality is provided by controlling the incidence of optical defects induced during manufacture by particulate contaminates by applying a soft plastic film to the outboard side of the plastic surface of the laminate and entrapping such contaminates during the lamination process in the soft plastic film.

9 Claims, 2 Drawing Sheets

ADHERE PRE-MASK TO ABRASION RESISTANT FILM

APPLY ADHESIVE FILM

APPLY COMPOSITE TO RECEIVING GLASS

PREPARATION OF GLASS/PLASTIC LAMINATES HAVING IMPROVED OPTICAL QUALITY

BACKGROUND OF THE INVENTION

The preparation of glass/plastic laminates for use in safety glazing applications presents unusually stringent manufacturing requirements in order to provide a product which exhibits acceptable optical quality.

Typically, glass/plastic laminates are produced in the following manner. A plastic composite having an adhesive side is placed onto a receiving glass sheet. A similarly shaped sheet of glass or rigid coverplate is placed over the surface of the composite. A vacuum is applied to the assembly or the assembly is pre-pressed to exclude air from between the layers. The assembly is then placed in an autoclave where lamination is completed by application of heat and pressure. In this operation the composite bonds to the glass, and the outboard surface of the composite is molded to replicate the surface of the coverplate.

Unfortunately, the resulting glass/plastic laminates do not always possess the desired optical qualities. During the bonding step any contaminating material between the coverplate and the surface of the plastic composite remains as a contaminant on the surface of the composite and may become embedded in the surface of the composite. After cooling, depressurization and coverplate removal, the contaminant leaves permanent, objectionable optical defects in the laminated structure. Damage done by very small particles can be observed by the naked eye. The visibility threshold for particles is typically 10 to 25 micrometers in diameter. However, a particle 3 to 5 micrometers in diameter can cause a visible defect in a glass/plastic laminate. Removal of the particles from the surface of the laminate after formation of the laminate does not cure the defect since the visual imprints made by the particles, i.e. depressions, remain on the plastic surface.

Efforts to solve this problem by modifying the surface of the coverplate have not been entirely successful. Obtaining optimum optical quality has required labor intensive cleaning procedures usually involving an expensive clean room atmosphere.

It is accordingly an object of the present invention to provide a process for producing laminates of improved optical quality. A further object is to provide glass/plastic laminates in which optical defects resulting from contaminants which may become embedded in the surface of the laminate during autoclaving or in other pressure/temperature processes are substantially eliminated without resorting to expensive clean room facilities and labor-intensive cleaning procedures.

SUMMARY OF THE INVENTION

In accordance with the present invention, a process is provided for controlling optical defects in glass/plastic laminates induced by particulate contaminants during the preparation of the laminates wherein heat and pressure are applied to a coverplate and a receiving glass to bond elements of the laminate. The process comprises forming a composite structure having exterior surfaces comprised of the outboard surfaces of a receiving glass and an abrasion resistant polymeric film with an adhesive material therebetween for bonding the elements of the laminate together. A soft plastic film is releasably adhered to the outboard surface of the abrasion resistant polymeric film. In the bonding step a coverplate is positioned over the composite structure, and sufficient heat and pressure are applied to the coverplate and the receiving glass to bond the elements of the composite structure and permit deformation of the soft plastic film to entrap particulate contaminants present between the outboard surface of the abrasion resistant polymeric film and the coverplate in the soft plastic film while maintaining the optical integrity of the surface of the abrasion resistant polymeric film.

It has been found that optical defects due to the presence of particulate contaminants on the surface of the abrasion resistant polymeric film surface are substantially eliminated by using the process of this invention. As heat and pressure are applied in bonding the polymeric film to the receiving glass, the particles become embedded in the soft plastic film. When the soft plastic film is removed, the optical integrity of the abrasion resistant polymeric film is found to be undisturbed.

In carrying out the process of this invention, a soft plastic film is releasably adhered to the outboard surface of an abrasion resistant polymeric film. As disclosed more fully later herein, the soft plastic film may first be adhered to the abrasion resistant polymeric film surface, or it may be applied later in a coating operation. Alternatively, the film or coating may be applied to the inboard side of the coverplate. Accordingly, the process of this invention as claimed is to be construed to cover the various alternative steps just mentioned and the alternative order in which they are performed.

Abrasion resistance of the polymeric film may be enhanced by the application of known special abrasion resistant coatings. Abrasion resistant coatings may be selected from those described in Hiss, U.S. Pat. Nos. 4,469,743 and Ubersax, 4,177,315, which are hereby incorporated by reference.

In forming the composite structure a coating or film of an adhesive material such as polyvinyl butyral film is applied to the inboard side of the abrasion resistant polymeric film. The adhesive coated side of the composite is then placed onto a receiving glass and a coverplate having substantially the same configuration as the receiving glass is placed over the composite. The composite is then subjected to heat and pressure for a sufficient time to bond the composite to the receiving glass. During the bonding step the soft plastic film covering the abrasion resistant polymeric film entraps particulate contaminants which are present between the the outboard surface of the composite and the coverplate. In the bonding step, in addition to excluding air from between the elements of the laminate, care should be taken to avoid entrapment of air between the soft plastic film and the abrasion resistant polymeric film surface since trapped air can cause optical distortion of the surface. After the bonding step, the soft plastic film may be removed, or it may be left in place and removed after the glass/plastic laminate has reached it destination for use.

DETAILED DESCRIPTION OF THE INVENTION

Figure 1:
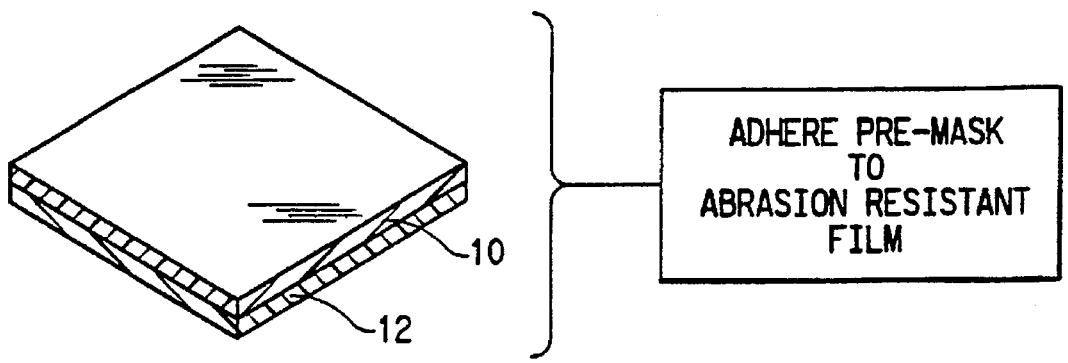
FIGS. 1 and 2 is a sequential illustration of a preferred embodiment of the process of this invention.
Figure 1:
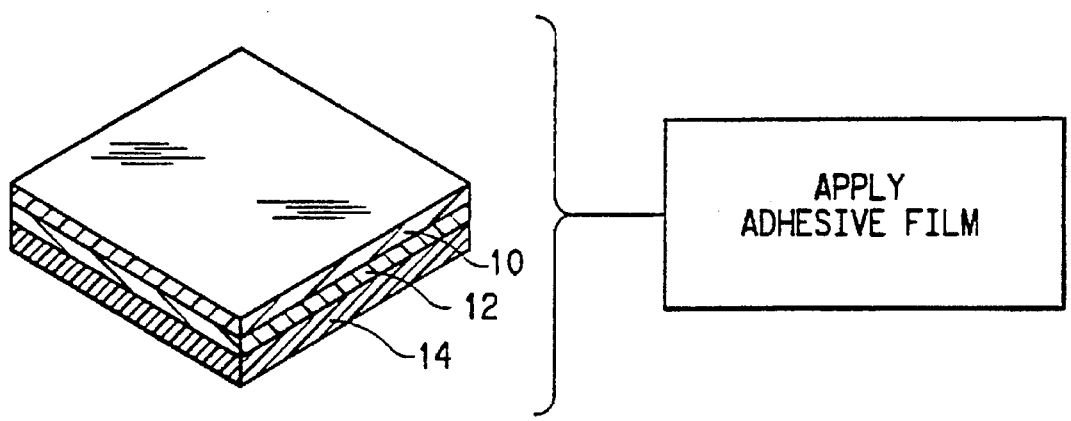
Figure 1:
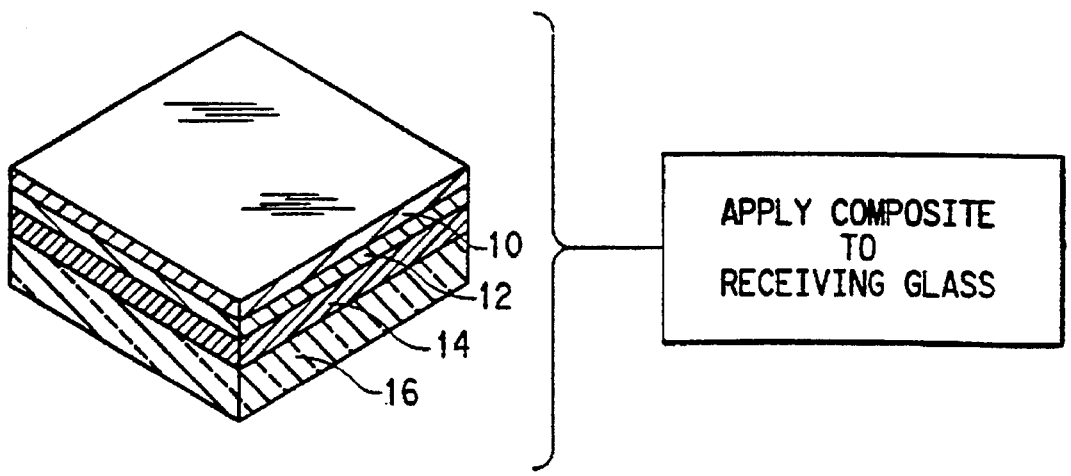
Figure 2:
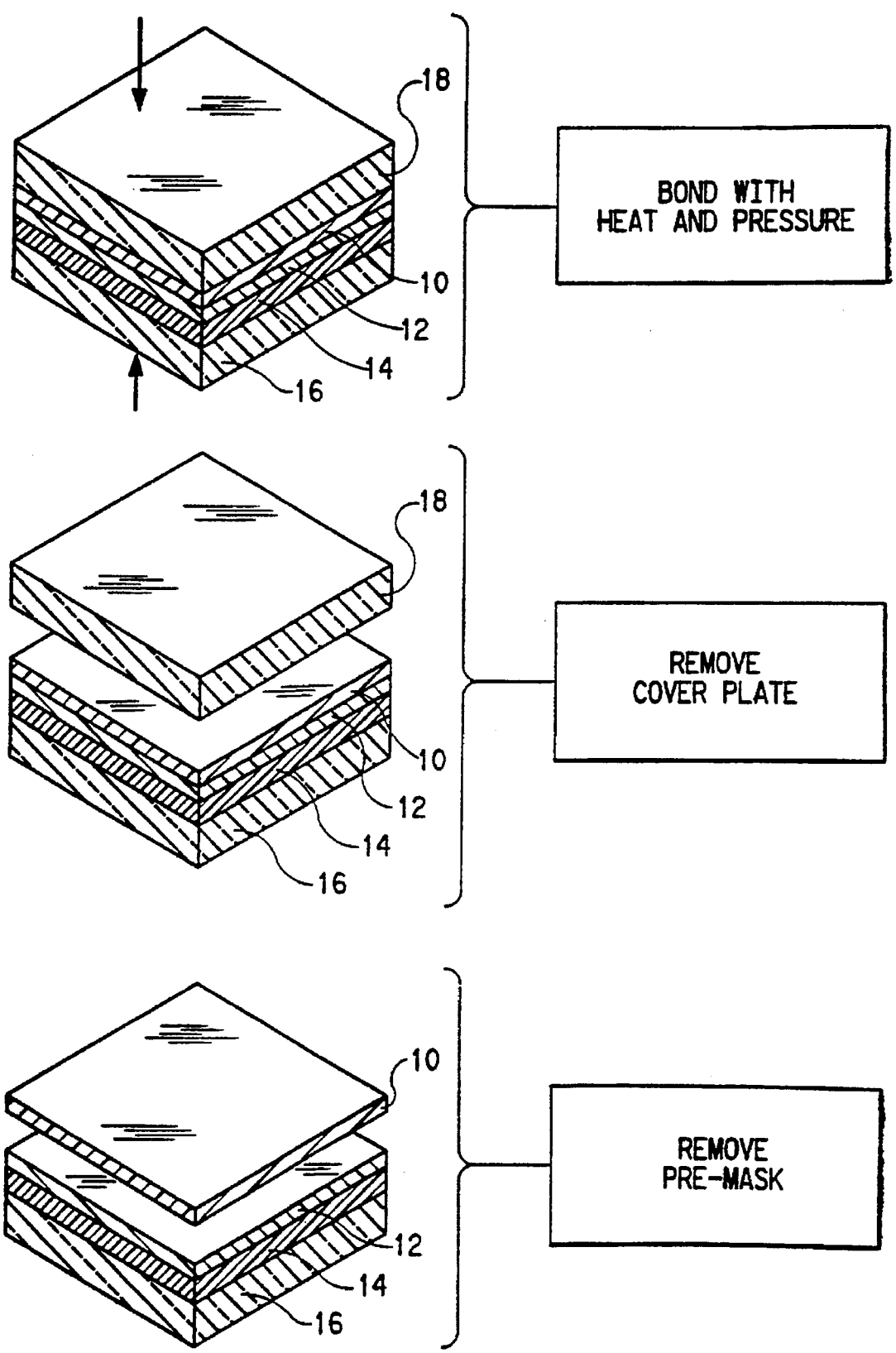

Referring now to the drawings, in a preferred embodiment of this invention illustrated in FIG. 1, a soft plastic film which will be referred to as pre-mask 10 is adhered to abrasion resistant polymeric film 12. An adhesive layer or coating 14 which may be an adhesive film such as polyvinyl butyral film is then applied to the inboard surface of polymeric film 12 to form a composite. The adhesive bearing side of the composite is then placed onto receiving glass 16 which may be flat or have a selected curvilinear configuration. Coverplate 18 is placed over the composite, the assembly is vacuum bagged and evacuated and then autoclaved under pressure. Generally, temperatures from about 100° to 170° C. and pressures from 2 to 30 atmospheres will be selected depending on the particular materials being used. At this stage of the process, contaminants which have been trapped between coverplate 18 and the surface of pre-mask 10 will have been pressed into the surface of pre-mask 10. After cooling, depressurization and coverplate removal, most particulate contaminants will be removed by stripping pre-mask 10 from the surface of polymeric film 12 leaving a glass/plastic laminate which is free from objectionable optical defects. It may be found that some contaminants remain on the surface, however, since they have not marred the surface of polymeric film 12 and damaged its optical quality, they may be removed mechanically.

The materials used in carrying out the process of this invention should be selected so that pre-mask 10 is substantially softer than abrasion resistant polymeric film 12. When heat and pressure are applied during the bonding step, the surface of pre-mask 10 must preferentially deform to receive particulate contaminants which would otherwise mar the surface of polymeric film 12. Pre-mask 10 and polymeric film 12 must adhere to each other during processing but must be readily separable after formation of the glass/plastic laminate. Pre-mask 10 must be of uniform thickness or gauge in order to avoid transfer of gauge bands to the surface of film 12. In addition a composition which does not flow during the lamination step should be used in order to prevent generation of distortions in the surface of film 12.

A preferred material for premask 10 is low density polyethylene (LDPE) film. A suitable LDPE will generally exhibit a Rockwell Hardness (Scale M) in the range of 10 to 15. Cast LDPE film with a light embossing pattern on one of the surfaces, such as Type RE-371 supplied by Consolidated Thermoplastics Co. of Schaumburg, Ill., is a preferred material. The embossing pattern is particularly helpful in controlling entrapment of air during the bonding step. In addition to LDPE, other grades of polyethylene such as linear low density polyethylene, medium and high density polyethylene, well known ethylene copolymers which contain small amounts of a comonomer such as vinyl acetate, methyl acrylate, etc. as well as polypropylene, soft polyurethanes and other elastomers may be used. While the pre-mask must be softer than the abrasion resistant polymeric film, it must at the same time maintain sufficient integrity so that optical distortion is not caused by uneven flow of the pre-mask while under autoclave conditions.

The thickness of the pre-mask should be balanced between the size of the contaminants expected to be present and the degree of optical smoothness desired. The pre-mask must be able to survive the autoclave cycle but should be readily stripped off before the glass/plastic laminate is placed in service. Generally, a soft plastic film having a thickness of 0.5 to 5 mils (12.7 to 127 micrometers) is selected with the preferred thickness being in the range from about 1 to 2 mils (25.4 to 50.8 micrometers).

In another embodiment of this invention, a thin layer of a low tack pressure sensitive adhesive is applied to the soft pre-mask. This permits the application of the pre-mask at room temperature to a composite of the abrasion resistant polymeric film and the thicker adhesive layer used to provide adhesion to a glass substrate. Another advantage of the room temperature process is better retention of the embossed pattern on the surface of the pre-mask that is desirable for efficient deairing in the vacuum step in the autoclave cycle. A suitable pressure sensitive adhesive is an acrylic polymer composition, Type 2021-03-CL, supplied by Main Tape of Wisconsin, Plymouth, Wis. The adhesive is applied at a thickness from about 0.1 to 0.2 mil (2.54 to 5.08 micrometers).

The abrasion resistant polymeric film may be selected from known polymeric materials which have been used in glazing applications referred to as optical laminates. Among the materials are polyesters, polyurethanes, polymethylmethacrylate, polyvinyl fluoride, polyvinylidene chloride, cellulose acetate, ionomeric polymers, cellulose esters and polycarbonates. The thickness will vary depending on the particular application for the laminate. Thicknesses in the range from about 2 to 14 mils (50.8 to 355.6 micrometers) are generally preferred.

A preferred material for the polymeric film is polyethylene terephthalate with a Rockwell Hardness (Scale M) in the range from about 80 to 85, and having an abrasion resistant coating. The polyethylene terephthalate film is biaxially oriented by stretching at least about 2.5 times in each of the longitudinal and transverse directions in the plane of the film. The film is dimensionally stabilized by heating under tension as described in Alles, U.S. Pat. No. 2,779,684. An important property of these polyethylene terephthalate films is that they exhibit a haze level of less than about 2.0%, as measured according to ANSI/AST D 1003-61, using the hazemeter specified in that test. One or both sides of the film may be conditioned to enhance its ability to adhere to other materials. Known coating compositions and surface treating techniques may be used.

The adhesive coating or film is preferably a sheet-like adhesive material which will permanently bond the glass and abrasion resistant polymeric film together. Among the suitable adhesive materials are acrylics, polyvinyl butyral resin, polyurethanes, maleic anhydride resins, polyesters, polyvinyl alcohol, polyvinyl chloride resins, polyamide resins, ethylene copolymers and elastomers.

A preferred material is plasticized polyvinyl butyral. Polyvinyl butyral can contain a wide variety of plasticizers, as known in the art, including for example, triethylene glycol di-2-ethylbutyrate, dihexyl adipate, triethylene glycol di-n-heptanoate, tetraethylene glycol di-n-heptanoate, propylene oxide oligomers and mixtures of these and other plasticizers. Particularly satisfactory polyvinyl butyral sheeting is that commercially available as Butacite® plasticizod polyvinyl butyral sheeting made by E.I. du Pont de Nemours and Company.

In another embodiment of this invention a polymeric coating is applied directly to the surface of abrasion resistant polymeric film. The coating should have a thickness sufficient to entrap particulate contaminants which are anticipated to be encountered. Coatable polymer compositions such as polyurethanes and polyesters may be used. A polyurethane hydrosol such as "Permuthane" UE-41-222, sold by ICI Specialty Chemicals, ICI Americas Inc., can be applied as a pro-mask to polymeric film 12 using a continuous coater. The pro-mask is readily peeled from the surface of an abrasion resistant polyethylene terephalate film after autoclaving but has sufficient adhesion to resist accidental removal during normal handling. Another acceptable coating can be provided using a polyurethane, "Morthane", a product of Morton-Thiokol, Inc., applied by dissolving the polyurethane in a solvent such as tetrahydrofuran. The selected polyurethane coatings are softer than the abrasion resistant polymeric film and particulate contaminants become embedded in the coatings thus preserving the optical quality of the glass/plastic laminate.

In some applications it may be found useful to adhere the soft plastic film to the inboard surface of the coverplate. After autoclaving, the coverplate is removed and the coating remains adherred to the coverplate. The coverplate may be discarded, or the coating maybe removed and the coverplate reused.

The use of a continuous coating process to provide a soft plastic film provides certain advantages over applying a preformed film. Application of the coating does not require pressure which may damage the surface of the abrasion resistant polymeric film. In addition, the coating is applied as a solution and will surround any particulate contamination at the time of application. Using a coating also facilitates use of a one-pass coating process whereby an abrasion resistant coating material may be first applied to and dried on the surface of the polymeric film and immediately followed by application of the pre-mask coating.

Various known adhesion control materials and techniques may be used to modify the adhesion characteristics of the pre-mask film with respect to the abrasion resistant polymeric film and to the coverplate. For example, a release agent may be applied to the inboard surface of the coverplate so that the pre-mask film remains on the surface of the laminate upon removal of the coverplate.

The invention is further illustrated by the following examples.

EXAMPLE 1

A 1.15 mil (29.2 micrometer) film of low density polyethylene and a 7 mil (177.8 micrometer) polyethylene terephthalate film having an abrasion resistant coating thereon of the type described in U.S. Pat. No. 4,177,315 were combined by advancing the films through a nip formed between a drum heated to 115°–120° C. and a soft press roll at a nip pressure of about 40–50 pounds per linear inch (7.0 to 8.76 kilonewtons per meter). The polyethylene film contacted the abrasion resistant coating on the polyethylene terephthalate film, while the uncoated side of the polyethylene terephthalate film contacted the hot drum. The operation was carried out with continuous rolls of film at a speed of 20 feet per minute (6 meters per minute). The laminate formed had sufficient adhesion, about 50 grams per inch, (19.3 Newtons per meter) to permit further processing without spontaneous separation.

The composite so made was used to prepare a glass/plastic laminate using a flat 12 inch by 12 inch (30.5 cm by 30.5 cm) sheet of glass, a 30 mil (762 micrometer) film of polyvinyl butyral as an adhesive layer, with the polyethylene pre-mask film of the composite in contact with a flat glass coverplate. After vacuum bagging and evacuating, the structure was placed in an autoclave and heated at a temperature of 135° C. and a pressure of 20 atmospheres (2.03 megapascals) for a period of 30 minutes. After cooling and depressuring, the coverplate and pre-mask were removed, and the final glass/plastic laminate was examined for optical imperfections. The laminate made following the above procedure was free from visible optical defects and exhibited excellent optical appearance. A companion laminate made without use of a pre-mask had an objectional number of particulate contamination related defects. These defects appeared as dimples or craters when viewed as a reflected image of the surface. In both experiments, no special steps, i.e. clean room conditions, were taken to eliminate contaminants such as dust particles.

EXAMPLE 2

The procedure of Example 1 was repeated using a 2 mil low density polyethylene film for the pre-mask. After removal of the coverplate and pre-mask film, no optical imperfections could be found on the plastic surface.

EXAMPLE 3

A 7 mil (177.8 micrometer) thick polyethylene terephthalate film bearing an abrasion resistant coating of the type described in Hiss, U.S. Pat. No. 4,469,743 and a 30 mil thick polyvinyl butyral film were combined by advancing the films through a nip formed between a drum heated to 170°–180° C. and a soft press roll at a nip presssure of 40–50 pounds per linear inch (7.0 to 8.76 kilonewtons per meter). The polyvinyl butyral film contacted the uncoated side of the polyethylene terephthalate film, while the coated side of the polyethylene terphthalate film contacted the hot drum. The composite of the two films was then advanced through a second nip of the same design in which the drum was kept at room temperature and combined with a 2 mil (50.8 micrometer) film of low density polyethylene that had been coated on one side with 0.1 mil (2.54 micrometer) of a low tack pressure sensitive adhesive sold as Type 2021-03-CL by Main Tape of Wisconsin, Plymouth, Wis. The adhesive side of the polyethylene film contacted the abrasion resistance coating on the polyethylene terephthalate film, while the polyvinyl butyral side of the composite contacted the room temperature drum. The operation was carried out with continuous rolls of each film at a speed of 35 feet per minute (11 meters per minute).

The three ply laminar structure so made was used to prepare a glass/plastic laminate by the procedure described in Example 1. After removal of the coverplate, the pre-mask film could be readily removed without damage to the abrasion resistant coating, and no optical imperfections due to the effects of particulate contamination could be observed.

The laminated structures provided by the process of this invention are useful in safety glazing applications. The improved optical quality of such laminates makes them particularly desirable for use in applications requiring the absence of visual defects.

We claim:

1. A process for controlling optical defects induced by particulate contaminates during the preparation of a glass/plastic surfaced laminate wherein heat and pressure are applied to a coverplate and a receiving glass to bond elements of said laminate comprising a) forming a composite structure having surfaces comprised of outboard surfaces of a receiving glass and an abrasion resistant polymeric film with an adhesive material there between, b) releasably adhering a plastic film of uniform thickness to the outboard surface of said abrasion resistant polymeric film, said plastic film being softer than said abrasion resistant polymeric film and when heated and placed under pressure, deforming to receive and entrap any particulate contaminates on the outboard surface of said abrasion resistant polymeric film, c) positioning a coverplate over said composite structure, in contact with said plastic film, and d) applying sufficient heat and pressure to said coverplate and said receiving glass to bond the elements of said composite structure and permit deformation of said plastic film to entrap particulate contaminants present between the outboard surface of said abrasion resistant polymeric film and said coverplate in said plastic film while maintaining the optical integrity of the surface of said abrasion resistant polymeric film.

2. The process of claim 1 wherein said plastic film is releasably adhered to the outboard surface of said abrasion resistant polymeric film by a pressure sensitive adhesive.

3. The process of claim 1 wherein said plastic film is polyethylene.

4. The process of claim 1 wherein said abrasion resistant polymeric film is polyethylene terephthalate and said adhesive material is polyvinyl butyral.

5. The process of claim 1 wherein said plastic film is adhered by coating a continuous film of a plastic material onto the outboard surface of said abrasion resistant polymeric film.

6. A composite glass/plastic laminated structure comprising a layer of glass having bonded to its inboard surface an abrasion resistant polymeric film and a plastic film, said plastic film being of uniform thickness, softer than said abrasion resistant polymeric film and releasably adhered to the outboard surface of said abrasion resistant polymeric film, said plastic film when heated and placed under pressure deforming to receive and entrap any particulate contaminates present on the outboard surface of said abrasion resistant polymeric film.

7. A laminated structure of claim 6 wherein said plastic film is polyethylene.

8. A laminated structure of claim 6 wherein said abrasion resistant polymeric film is polyethylene terephthalate.

9. A laminated structure of claim 6 wherein said glass layer is bonded to said abrasion resistant polymeric film by a film of polyvinyl butyral.

* * * * *